United States Patent [19]

Suzuki

[11] Patent Number: 5,790,764
[45] Date of Patent: Aug. 4, 1998

[54] IMAGE OUTPUT DEVICE AND IMAGE CONTROL METHOD FOR SMOOTHING IMAGE OR INCREASING IMAGE RESOLUTION BY USE OF SAME

[75] Inventor: Yoshitaka Suzuki, Tokyo, Japan

[73] Assignee: Kyocera Corporation, Kyoto, Japan

[21] Appl. No.: 625,354

[22] Filed: Apr. 1, 1996

Related U.S. Application Data

[63] Continuation of Ser. No. 67,212, May 26, 1993.

[51] Int. Cl.$^6$ .................................................. G06K 15/00
[52] U.S. Cl. ......................................... 395/109; 395/102
[58] Field of Search .................................. 395/109, 112, 395/101, 102, 115, 116, 113, 108, 128, 132, 142, 162; 358/447, 448, 462, 464, 455, 456; 347/131, 132; 382/269, 266

[56] References Cited

U.S. PATENT DOCUMENTS

| | | | |
|---|---|---|---|
| 4,698,768 | 10/1987 | Thuy et al. | 395/142 |
| 4,847,641 | 7/1989 | Tung | 347/131 |
| 5,029,108 | 7/1991 | Lung | 395/109 |
| 5,299,308 | 3/1994 | Suzuki et al. | 395/162 |
| 5,386,509 | 1/1995 | Suzuki et al. | 395/162 |
| 5,579,451 | 11/1996 | Suzuki | 395/102 |

*Primary Examiner*—Edward L. Coles, Sr.
*Assistant Examiner*—Dov Popovici
*Attorney, Agent, or Firm*—Loeb & Loeb LLP

[57] ABSTRACT

The present invention comprises the steps of one-dimensionally converting, into a vector, a dot distribution around an attentional pixel in a K×L coordinate (K and L=odd numbers, M=L or K≠L) adjacent to the attentional pixel, specifically, in a 3×3 coordinate, 3×5 (5×3) coordinate or 3×7 (7×3) coordinate on the basis of rasterized data of the coordinate; and then smoothing the image or heightening an image density by correcting a location error of the attentional pixel on the basis of the vector information and the kind of attentional pixel (a dot or a blank). Thus, according to the present invention, the image patterns can be smoothed and the image resolution can be increased in a pseudo state with ease and high precision without complicating a circuit constitution by a simple judgement operation.

6 Claims, 9 Drawing Sheets

3 × 3

| -1,-1 | 0,-1 | 1,-1 |
|---|---|---|
| -1,0 | 0,0 | 1,0 |
| -1,1 | 0,1 | 1,1 |

DOT  BLANK

|  |  | -1,-3 | 0,-3 | 1,-3 |  |  |
|---|---|---|---|---|---|---|
|  |  | -1,-2 | 0,-2 | 1,-2 |  |  |
| -3,-1 | -2,-1 | -1,-1 | 0,-1 | 1,-1 | 2,-1 | 3,-1 |
| -3,0 | -2,0 | -1,0 | 0,0 | 1,0 | 2,0 | 3,0 |
| -3,1 | -2,1 | -1,1 | 0,1 | 1,1 | 2,1 | 3,1 |
|  |  | -1,2 | 0,2 | 1,2 |  |  |
|  |  | -1,3 | 0,3 | 1,3 |  |  |

FIG. 1(B)

ORIGINAL IMAGE LINE

3×3 — 3×5 — 3×7

FACTOR 4    FACTOR 2    FACTOR 1

FIG. 1(C)

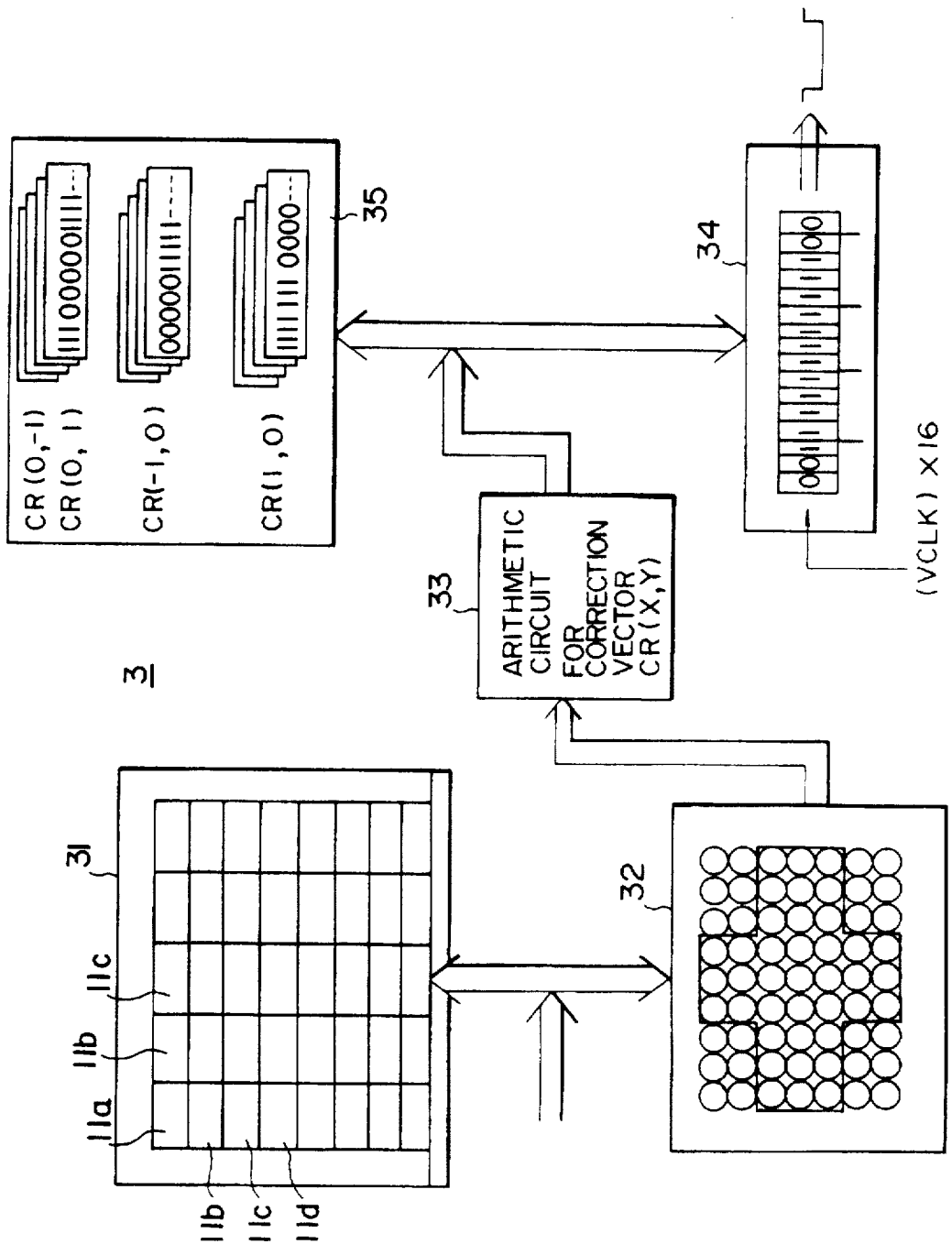

FIG. 5A(A)
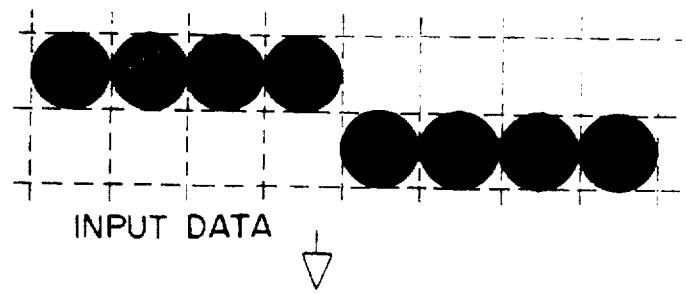
INPUT DATA
FIG. 5A(B)
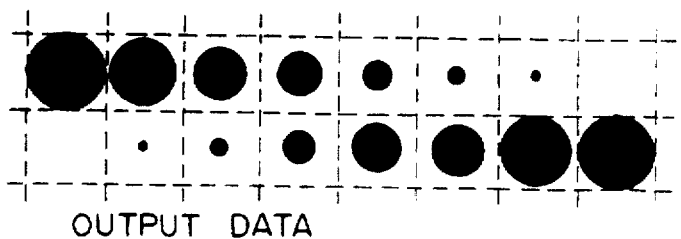
OUTPUT DATA
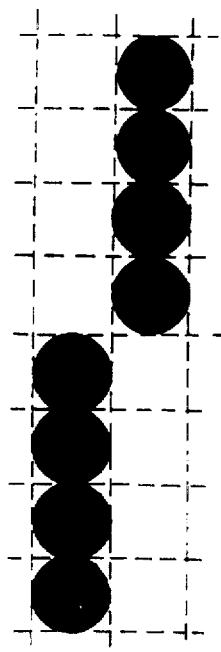 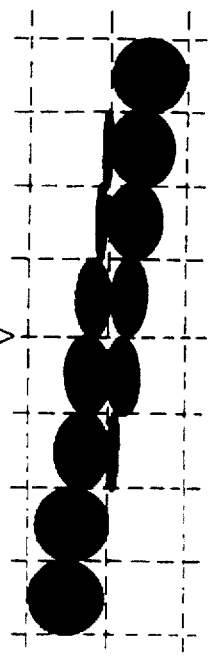
FIG. 5B(A)   FIG. 5B(B)

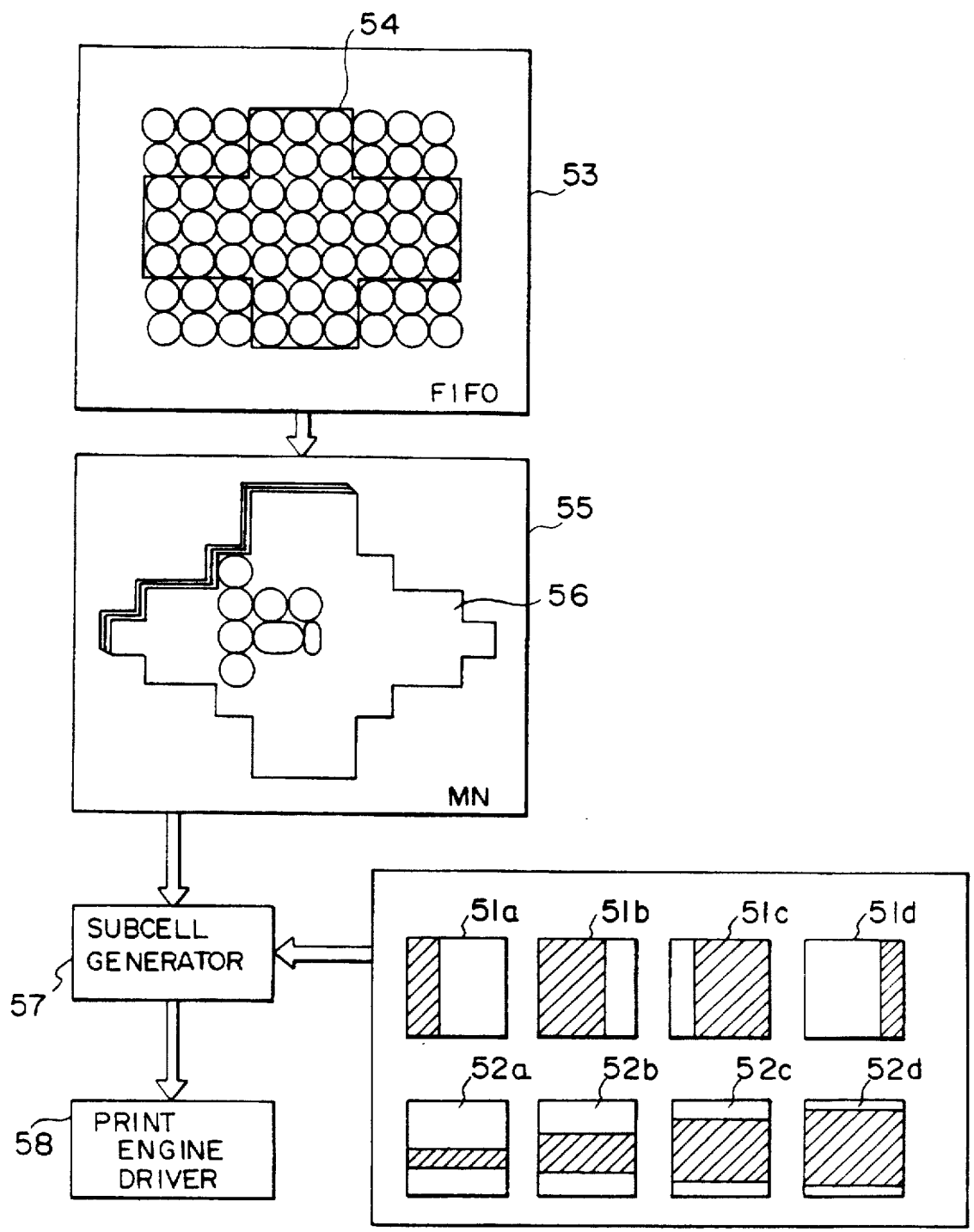

IMAGE OUTPUT DEVICE AND IMAGE CONTROL METHOD FOR SMOOTHING IMAGE OR INCREASING IMAGE RESOLUTION BY USE OF SAME

This is a continuation of application Ser. No. 08/067,212, filed May 26, 1993.

BACKGROUND OF THE INVENTION (i) Field of the Invention

The present invention relates to an image output device for forming an image pattern in a dot matrix state, for example, a page printer such as a laser printer or a LED printer, or a CRT display, and an image control method for smoothing an image or increasing an image resolution by the use of the output device.

(ii) Description of the Prior Art

Heretofore, a laser printer has been known in which image patterns are formed in a dot matrix state on a photo-sensitive drum by repeatedly photo-scanning, in a main scanning direction and along buses on the drum, laser beams which have been modulated on the basis of video data serially output from an image controller.

Furthermore, a LED printer has also been known in which an arrayed LED head having LED elements linearly arranged in a main scanning direction is disposed along the bus of a photosensitive drum so as to confront the photosensitive drum, and the LED elements are controlled to drive (burn) one line at one time or every one block of the line on the basis of video data and the photosensitive drum is relatively moved in a secondary scanning direction, thereby forming an image pattern in a dot matrix state on the photosensitive drum.

In these kinds of printers, a processing for smoothing the image pattern or a processing for increasing an image resolution is necessary in order to obtain a sharper image, because the printers take a system in which an optional letter or graphic form is formed by suitably depicting a dot image pattern in an n×m dot matrix region on the basis of video data.

In the first place, the conventional technique of the processing for smoothing the image pattern will be described.

For example, in the case of forming a slanted line or a curved line such as "V" or "O", adjacent dots in the line are inconveniently formed in the state of a step. Additionally, the crossing portion of a letter such as "X" is made bold, because a plurality of dots are closely arranged, and in consequence, a printing quality deteriorates unavoidably.

In order to overcome such a drawback, a shift, i.e., a deviation of an attentional dot from the slant of an original line pattern is regarded as ½ of a distance between the attentional dot and a dot adjacent thereto, and presence or absence of the deviation of the attentional pixel is confirmed by ORing/ANDing the attentional dot or a blank (the dot which may be the blank will be generically called "pixel") with an adjacent pixel.

The above-mentioned dot means the pixel which will be printed by the adhesion of a toner on one corresponding point in an n×m dot matrix region, and the above-mentioned blank means the pixel showing a background point on which any toner will not adhere in the matrix region.

As described above, the deviation of the attentional dot which forms the step is at most ½ of a distance between the two dots (in the case that the slant of a slanted line which is the image pattern is 45°). However, as the gradient of the slanted line is near to a vertical (horizontal) direction, a gap between the above-mentioned deviation and an original image increases. In other words, when the gradient of the slanted line is near to the vertical or the horizon, it is very difficult to smooth the step of the slanted line even by ORing/ANDing the adjacent pixels.

The step of the slanted line always contains the adjacent dot and blank in the main scanning direction and/or the secondary scanning direction. Thus, as described in Japanese Patent Application Laid-open No. 251761/1985, a technique has been suggested in which the blank adjacent to the attentional dot in the main scanning direction is replaced with a dot having a small energy density (which will be the dot having a small diameter on a photosensitive drum) to smooth the step portion. In this technique, however, the dot having the small diameter is merely added to the blank region adjacent to the attentional dot. Therefore, on a fine slanted or curved line, the dot-added portion becomes bold, which does not always lead to the improvement of the image quality. In addition, since this technique intends to add the dot to the blank in the main scanning direction, a smoothing effect is low, as the gradient of the slanted or curved line decreases.

In order to overcome the above-mentioned drawback, U.S. Pat. No. 4,847,641 (hereinafter referred to as "U.S. Pat. No. 641") has suggested a technique in which the dot having a small diameter is added to the blank adjacent to the attentional dot and the attentional dot itself is also narrowed (flattened) and apparently moved to one side, and the addition of the small-diameter dot and the flattening of the attentional dot are achieved not only in the main scanning (horizontal) direction but also in the secondary scanning (vertical) direction, in other words, in the two directions of right/left and top/bottom.

Next, the constitution of this conventional technique will be briefly described in reference to FIG. 9. In the first place, there are prepared four compensating subcells 51a, 51b, 51c and 51d which are narrowed in the main scanning direction and four compensating subcells 52a, 52b, 52c and 52d which are narrowed in the secondary scanning direction. Next, bit data (binary data arranged in a matrix state in a secondary scanning direction, and generally, 1 and 0 correspond to the dot and the blank, respectively) corresponding to video data are successively serially stored in an FIFO buffer 53 capable of storing the data every plural lines, and a plurality of upper, lower, right and left bit data adjacent to the attentional pixel are extracted through a sample window 54 and then forwarded to a matching network 55. In this matching network 55, the bit map data present in the sample window 54 are compared to many templates 56 stored in the matching network 55. If the bit data accord with the template 56, the compensating subcell 51a, 52a ... for flattening the attentional dot and the compensating subcell 51a, 52a ... for adding the flattened small dot to the upper, lower, right or left blank adjacent to the attentional dot are selected from a subcell generator 57. On the contrary, if the bit data do not accord with any templates 56, the standard pixel is selected as it is. Afterward, the thus selected video data are serially output to a print engine driver 58 to carry out printing. However, this conventional technique also has some drawbacks. That is, in the practice of the technique, the two selecting operations must be carried out to select the subcells of the attentional pixel and the adjacent other pixels. Additionally, the four subcells are required for each of the horizontal direction and the vertical direction, and so the number of the templates necessary to compare the bit map data present in the sample window 54 with the templates is $(2^4) \times (2^4) = 256$ in both the directions. In order to smooth the image patterns, application templates are further needful, and the total number of the templates is too large, which requires large-capacity memories for the large number of the templates and which unavoidably complicates and consequently enlarges a circuit constitution for the comparing operation.

Next, some problems associated with the increase in an image resolution will be described.

As described above, among page printers such as laser printers and LED printers, the printers having an image constitution of a low dot pitch density, for example, 300 dpi are often employed because of low costs, compaction and the like. In recent years, however, for the purpose of improving image quality and resolution, printers in which the dot pitch density is heightened to, for example, 600 dpi have been suggested.

However, in order to obtain the pixel image of 600 dpi, bit map data in an image processing circuit must be also developed with the similarly high density in data memory, which leads to not only the increase in memory capacity, the complication of a hardware constitution and the increase of the cost but also the retard of a processing rate.

In general, fonts of English and Japanese, already existent word processing softs and other application softs have been made on the basis of 300 dpi, and therefore, in the case that the 600 dpi pixel image is employed, they cannot be used as they are, with the result that the employment of the 600 dpi pixel image is devoid of prevalence.

Accordingly, it has been attempted that the bit map data developed in the state of 300 dpi are heightened to a high resolution level of 600 dpi by using a data conversion circuit, and then fed to the print engine driver.

For example, according to Japanese Patent Application Laid-open No. 59362/1990, there are used 3 line memories having a memory capacity corresponding to 600 dpi, a frequency multiplication circuit for doubling a video clock frequency of 300 dpi and a discriminant circuit for doing comparison/discrimination by logical sum, and the writing of bit map data in one line memory is carried out in parallel with the reading of the data from other two line memories by the use of a clock converted into 600 dpi in the frequency multiplication circuit. The thus read two data are ORed/ANDed in the discriminant circuit to output image data, and the image data of 600 dpi for each scanning line are successively output to a print engine driver of a laser printer by cyclically moving the above-mentioned line memory every one corresponding scanning line.

However, the foundation of the above-mentioned conventional technique resides in that the bit map data developed at 300 dpi in main and secondary scanning directions are enlarged simply twice every one scanning line, and the high-density bit map data of 600 dpi are then obtained by ORing/ANDing the attentional pixel with an adjacent reference bit. In other words, this technique is substantially equal to that the clock is halved and the original image data are enlarged twice by ORing/ANDing. This conventional technique can easily achieve the resolution enhancement of a slanted line at about 45°, but it cannot smoothly achieve that of the slanted line close to a horizontal line or a vertical line.

In order to overcome the above-mentioned drawback, a technique has also been suggested in which the original dot information of upper and lower 5 lines×7 bits adjacent to the attentional bit is stored, and the dot information is ORed/ANDed by a logical circuit to heighten resolution in consideration of a location error (Japanese Patent Application Laid-open No. 60764/1990).

However, it makes the circuit constitution of the hardware extremely complex to OR/AND the two-dimensional 5×7 dot information which is as much as 35 bits.

Furthermore, in the conventional technique, the enhancement of the resolution is limited to a two-fold level, and it is impossible to achieve a higher level of the resolution.

SUMMARY OF THE INVENTION

An object of the present invention is to provide a page printer or another image output device which can smooth image patterns and can increase an image resolution in a pseudo state with ease and high precision without complicating a circuit constitution by a simple judgement operation.

Another object of the present invention is to provide a method for smoothing an image and improving the quality of dots themselves by which the high-quality image which can withstand the enlargement of smoothed data can be obtained.

Still another object of the present invention is to provide a method for forming a high-density image which can increase the density of image data in a pseudo state and can heighten resolution up to 600 dpi or a higher level such as 900 dpi, 1200 dpi or 2100 dpi, a print engine driver for 300 dpi being kept usable.

A further object of the present invention is to provide a method for forming a high-density image which can effectively heighten resolution without being restricted by the gradient of an original slanted line or curved line, in other words, even in the case of a slanted line having a gradient close to a horizontal line or a vertical line.

The present invention is directed to a method for controlling an image which comprises the steps of one-dimensionally converting, into a vector, a dot distribution around an attentional pixel in a K×L coordinate (K and L=odd numbers, M=L or K≠L) adjacent to the attentional pixel, specifically, in a 3×3 coordinate, 3×5 (5×3) coordinate or 3×7 (7×3) coordinate on the basis of rasterized data of the coordinate; and then smoothing the image or heightening an image density by correcting a location error of the attentional pixel on the basis of the vector information and the kind of attentional pixel (a dot or a blank).

In the present invention, for the rasterized data of the 3×3 coordinate, one piece of the vector information is enough. However, this piece of the vector information can only correct a location error of ½ of a dot pitch, and in particular, it cannot achieve the fine smoothing.

In the case of the 3×5 (5×3) coordinate or the 3×7 (7×3) coordinate, the precise correction of the location error can be accomplished by obtaining the vector information on the basis of the rasterized data of the 3×5 (5×3) coordinate or the 3×7 (7×3) coordinate.

For example, as the rasterized data of the 3×7 (7×3) coordinate, there are obtained three pieces of the vector information, that is, the first vector information based on the rasterized data of the 3×3 coordinate, the second bit group adjacent to the outer periphery of the rasterized data of the 3×3 coordinate, i.e., the second vector information based on the rasterized data of the 3×5 (5×3) coordinate, and the third bit group adjacent to the outer periphery of the 3×5 (5×3) coordinate, i.e., the third vector information based on the rasterized data of the 3×7 (7×3) coordinate. Above all, the first vector information based on the rasterized data of the central component (the 3×3 coordinate) adjacent to the attentional pixel has the largest influence on the location error.

Thus, the three pieces of the vector information are multiplied by constants and then summed up to obtain the total vector information, and in this case, the first vector information of the 3×3 coordinate is multiplied by the largest constant. The thus obtained total vector information is employed as the correction vector information for the 3×7 (7×3) coordinate, whereby the fine correction control of the attentional pixel location error, particularly the fine smoothing of the image pattern can be achieved.

In the embodiment given hereinafter, the correction vector information is obtained for the directional components of the K×L coordinate, i.e., both of the total vector information of the 3×3, 3×5 and 3×7 coordinates as ±X components and the total vector information of the 3×3, 5×3 and 7×3 coordinates as ±Y components. However, an actual operation is simple. It is first judged whether a slanted line containing the attentional pixel is near to a vertical line or a horizontal line by the 3×3 coordinate, and if it is near to the vertical line, the total vector information in the ±Y axis direction of the 3×5 and 3×7 coordinates is obtained. If it is near to the horizontal line, the total vector information in the ±X axis direction of the 5×3 and 7×3 coordinates is obtained. This procedure is enough to obtain the necessary information.

(Method for Smoothing an Image Pattern)

Now, a method for smoothing an image pattern will be described.

An image control method using the vector information, for example, a method for smoothing an image pattern comprises preparing a plurality of registers in which smoothing data for the location error correction are stored; selecting the proper register on the basis of the vector information and the kind of attentional pixel; forming a location error correction pulse for forming the attentional pixel on the basis of correction data in the selected register; and then outputting the correction pulse to a print engine driver, whereby the image can be smoothed.

Next, advantages of the smoothing method of the present invention will be described in comparison with the above-mentioned U.S. Pat. No. 641.

As described above, according to U.S. Pat. No. 641, the rasterized data of the coordinate present in a window 54 of 33 bits [(3×7)+(7×3)−(9 of overlaps)] in all are randomly compared with many templates 56 stored in a network 55, and a corresponding template is selected from a subcell generator 57. In other words, the rasterized data of the 33-bit coordinate are two-dimensionally randomly compared with the templates, and therefore, as described above, a tremendously large number of the templates are required to smooth the image pattern (the $2^{33}$ templates at maximum). Thus, large-capacity memories for many templates are required, and a circuit constitution for the comparison is also complicated and as a result, it must be enlarged, as described above.

On the contrary, the technique of the present invention is similar to that of U.S. Pat. No. 641 in the employment of the window as the rasterized data of the (3×7)+(7×3) coordinate, but it does not randomly and two-dimensionally compare the data with the templates. In the present invention, the vector information of the dot distribution of the attentional pixel and the adjacent pixels in the window, in other words, the one-dimensional correction vector information of any of −X, +X, −Y and +Y directions in which a location error is present is first obtained, and a register corresponding to, e.g., a compensating subcell is then selected on the basis of the vector information to smooth the image pattern. Therefore, the one-dimensional processing, more detailedly, the linear function processing is enough, and as a result, neither many templates nor any circuit constitution for the comparison is necessary. In consequence, a problem of the conventional technique such as the enlargement of the circuit constitution can be solved.

In addition, the register can be automatically selected on the basis of the vector information, for example, on the basis of 4K integers [(−X, +X, −Y and +Y directions)×K (k≧L)] at maximum and the kind of attentional pixel (a dot or a blank). In other words, the extremely fine control can be achieved only by preparing the 2K registers every one directional component (−X, +X, −Y or +Y direction).

Therefore, according to the present invention, the image pattern can be smoothed on the basis of the one-dimensional correction vector information in any of the −X, +X, −Y and +Y directions having the location error by a simple judgement with ease and precision and without complicating the circuit constitution.

Moreover, the present invention intends to smooth the image pattern and simultaneously to heighten the quality of the dots themselves, and thus the high-quality image can be obtained which can sufficiently withstand the enlargement of the data after the smoothing processing.

(Method for Increasing an Image Density)

Next, reference will be made to a method for forming a high-density image from low-density video data on the basis of the above-mentioned vector information.

The method for increasing an image density is characterized by comprising the steps of selecting one suitable conversion register from a high-density conversion register group in which previously prepared M×M bit data for location error correction are stored, on the basis of the above-mentioned correction vector information and the bit kind of attentional pixel (a dot or a blank); forming high-density video data every one scanning line on the basis of bit data read out from the selected register; and then outputting the video data to a print engine driver in accordance with an M-fold video clock.

Next, an image output device which can smoothly heighten the image density will be described, but for the simplification of explanation, reference will be made to a circuit constitution for increasing the image density twice (M=2) from a low-density image of 300 dpi to a high-density image of 600 dpi in accordance with FIG. 7.

(1) In the first place, a means 42 is disposed which converts, into a vector, a dot distribution around an attentional pixel in a 3×3 coordinate including the attentional pixel on the basis of rasterized data of the coordinate.

(2) Next, a means 44 is disposed which selects one suitable conversion register from a density doubling register group 45 in which previously prepared 2×2 data for location error correction are stored, on the basis of vector information obtained by the above-mentioned means 42 and the kind of attentional pixel (a dot or a blank).

In this case, in order to precisely correct the location error, {4×(M×M)−2} conversion registers 45a . . . , that is, in the case that the density is doubled, the 14 conversion registers 45a . . . are necessary (counting in a case where all of 4 bits are "0" and a case where all of 4 bits are "1", the number of the conversion registers 45a . . . is 16).

(3) A pair of data memories 47A, 47B are disposed which store video data corresponding to a nth scanning line and a n+1)th scanning line from data latched circuits 46, 46B to which 2 (M) bit data corresponding to the respective lines have been directly or indirectly fed from the registers 45a...

Each of the above-mentioned data memories 47A, 47B is required to have a memory region capable of writing the data of at least one scanning line.

(4) A shift register 48 is disposed which reads the above-mentioned pair of data memories 47A, 47B and then serially outputs high-density image data of corresponding scanning lines to a print engine driver, while the high-density image data are synchronized to a video clock having a density which is twice as much as the density of an original video clock.

The meaning of "2 (M) bit data have been directly or indirectly fed" in the above paragraph is as follows. The read bit width of the data memories 47A, 47B do not always accord with the data length of the M bit data (2 bits in the above case). Therefore, the data latch circuit 46B having a memory length corresponding to the bit width of the data memories 47A, 47B is disposed, and the M bit data of the register 45 corresponding to each scanning line are synchronized to the original image video clock and successively latched every M bits in the data latched circuit 46B. The data corresponding to the bit width are then Outputted from the data latch circuit 46B to the data memories 47A, 47B.

In the present invention, the rasterized data are not limited to the above-mentioned 3×3 coordinate, and some coordinates are applicable. First, it is judged whether the 40° vector component of the attentional pixel, i.e., the gradient of the slanted line pattern is near to a vertical line or a horizontal line in the 3×3 coordinate. Next, if the slanted line is near to the vertical line, the total vector information in ±Y axis direction in 3×5 and 3×7 coordinates is obtained, and if it is near to the horizontal line, the total vector information in ±X axis direction in 5×3 and 7×3 coordinates is obtained.

In this case, the above-mentioned three pieces of the vector information are multiplied by factors and then summed up to obtain the total vector information, and at this time, the information of the 3×3 coordinate is multiplied by the largest factor and that of the 7×3 or 7×3 coordinate is multiplied by the smallest factor. The thus obtained total vector information is employed to obtain the fine location error information for the attentional pixel. In particular, the fine location error information permits increasing the image density from 300 dpi to 900 dpi or 1200 dpi, and in other words, the image density can be heightened three times or four times by the use of the fine location error information.

Next, advantages of the image density enhancement according to the present invention will be described in comparison with Japanese Patent Application Laid-open No. 59362/1990.

As described above, in the technique disclosed in Japanese Patent Application Laid-open No. 59362/1990, the rasterized data of the 35-pixel coordinate are randomly two-dimensionally logically compared to the templates, and therefore the disclosed technique has the drawback that a large-scaled circuit constitution is required.

On the other hand, the present invention does not two-dimensionally compare to the templates. According to the present invention, correction vector information in any one-dimensional direction of the −X, +X, −Y and +Y directions having a location error is first obtained as in the above-mentioned smoothing processing, and a previously prepared register is selected on the basis of the vector information to increase an image density, i.e., an image resolution. Therefore, a linearly functional processing is enough, and the load of a circuit constitution and CPU can be relieved. In addition, speed-up can also be achieved.

The selection of the register can also be automatically made on the basis of an integer obtained from the correction information in any direction of the −X, +X, −Y and +Y directions and a kind of attentional pixel (a dot or a blank), and therefore extremely fine control can be achieved in consideration of locational correction only by preparing the {4×(M×M)−2} registers every one direction component.

Consequently, according to the present invention, the increase in the image density in a main scanning direction and a secondary scanning direction can be accomplished by a one-dimensional processing on the basis of the correction vector information. Therefore, a high-quality image can be easily and precisely obtained without complicating the circuit constitution by simple arithmetic processing, and since a locational correction function is employed, the obtained image can sufficiently withstand the enlargement of the data after the increase in the image density.

BRIEF DESCRIPTION OF THE DRAWINGS

FIG. 1 is a functional view showing the fundamental principle of the present invention, and (A) is a fundamental constitutional view, (B) is coordinate data necessary for the operation of (C), and (C) shows an operational procedure for obtaining a correction vector information of an attentional pixel.

FIG. 3 is a block diagram showing the whole constitutional view of the smoothing circuit of the present invention.

FIG. 5 shows an image dot distribution formed on a photosensitive drum on the basis of the video data in FIG. 4, and (A) and (B) show the dot distribution before the smoothing processing and after the smoothing processing, respectively.

FIG. 9 is a block diagram showing the whole constitutional view of a conventional image smoothing circuit.

DETAILED DESCRIPTION OF THE PREFERRED EMBODIMENT

Figure 2:
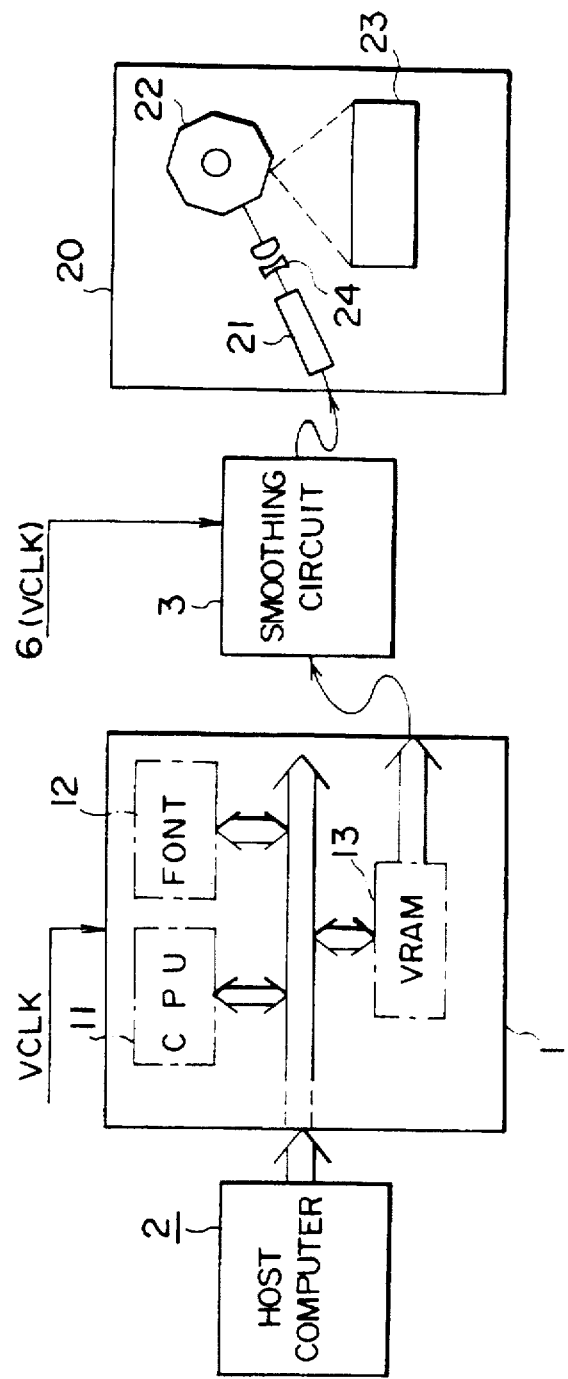
FIG. 2 is a fundamental constitutional view of a printer incorporated with an image smoothing circuit which can be used in an embodiment of the present invention.

Now, the present invention will be exemplarily described in more detail in accordance with its embodiment in reference to drawings. However, it should be understood that size, material, shape and relative arrangement of constitutional parts described in the embodiment do not intend to limit the scope of the present invention and they are merely exemplary.

In the first place, reference will be made to procedure for obtaining location error information which can be used to smooth an image pattern and to increase an image resolution in the present invention, together with the description of the successive route toward the present invention.

As described above, when an original image containing a slanted line or a curved line is developed as an image pattern on a photosensitive drum in the form of a matrix coordinate, the original image is represented by a combination of vertical and horizontal dots containing a step in X axis and Y axis directions.

In the image pattern containing the step developed in the form of a matrix coordinate, a dot (0,0) at the step shown in FIG. 1 (A) is considered to be a dot containing an error, i.e., a deviation to be shifted in a right direction as compared with a position on which the dot should be actually present so that, for example, a slanted line may be located on a coordinate determined by resolution.

The deviation from the central dot, i.e., the deviation of the coordinate point (0,0)→a coordinate point (1,0) is obtained as a synthetic vector $A_1$ of the following two kinds of vectors $A_2$ and $A_3$:

vector $A_2$: point (0,0)→point (1,−1)

vector $A_3$: point (0,0)→point (0,1)

Hence, $A_1 = A_2 + A_3$.

Next, how to obtain fundamental vector information regarding a 3×3 dot map will be described.

That is, as shown in FIG. 1 (A), a 3×3 matrix is defined by a coordinate, and the pixel state (dot/blank) of the coordinate (X,Y) is denoted by D(X,Y)=1 or 0. For example, when the attentional pixel is a dot, it can be represented by D(0,0)=1.

When a correction vector corresponding to ½ of a distance between the dots is formed, the location error of the attentional dot D(0,0) is largest.

That is, the deviation from the attentional pixel is a synthetic vector $A_1$ (=$A_2+A_3$) obtained by summing up vectors.

However, in the case of the bit map information of the 3×3 coordinate, a first step locational correction of the ½ of the dot pitch can only be achieved, and as the gradient of the original slanted line deviates from 45° (as it approaches to horizon or vertical), the location error of the attentional dot increases.

(However, the double enhancement of the image density from 300 dpi to 600 dpi can be sufficiently achieved by performing the first step locational correction of ½ of the dot pitch in the 3×3 coordinate.)

For example, when the slanted line is near to the horizontal line or the vertical line, the attentional dot has the large location error owing to the smoothing processing by OR/AND, and thus the large correction is required. This reason is that a ratio of the deviation of the dot in the X direction to that of the dot in the Y direction is low, or a ratio of the deviation of the dot in the Y direction to that of the dot in the x direction is low.

Therefore, in the case that the rasterized data of the 3×3 coordinate are selected as the correction vector of the attentional dot of the dots constituting the slanted line near to the horizontal line, it is difficult to obtain a sufficient effect.

Therefore, in the present invention, the rasterized data are enlarged in horizontal and vertical directions to prepare a matrix of a 7×3 coordinate and a 3×7 coordinate, and on the thus enlarged matrix, the correction vector is then obtained to carry out the control.

Theoretically, it is also possible that the correction vector is obtained by the use of the data of a matrix containing an N×3 coordinate and a 3×N coordinate in which N is 7 or more, to smooth the image pattern. However, the employment of the matrix containing the 7×3 coordinate and the 3×7 coordinate is preferable in view of the performance of the print engine which is now used, as described hereinafter.

Thus, how to obtain the correction vector of the matrix containing the 7×3 coordinate and the 3×7 coordinate as shown in FIG. 1 (B) will be described as follows.

First, the correction vector of the rasterized data of the 3×7 coordinate regarding the attentional dot can be obtained by calculating vectors of bold arrows in the 3×3 matrix, the 3×5 matrix and the 3×7 matrix in FIG. 1 (C), and then summing up the three calculated vectors.

In FIG. 1 (C), each slanted dotted line is the gradient of an actual image line.

Among the three vectors, the vector of the 3×3 matrix has the largest location error, and that of the 3×7 matrix has the smallest location error.

In order to facilitate the digital processing and in order to precisely correct the location error of the attentional pixel, the vector of the 3×3 matrix, that of the 3×5 matrix and that of the 3×7 matrix are multiplied by factors of, for example, 4, 2 and 1, respectively. On the basis of the thus multiplied correction vectors and the kind of attentional pixel (the dot or the blank), the location error of the attentional pixel is corrected to smooth the image pattern or to increase the image density.

Next, how to obtain the correction vector of the 3×7 coordinate shown in FIG. 1 (C) will be described in more detail.

(1) In the first place, a first correction vector will be obtained from the 3×3 matrix as follows.

The pixels for giving correction vectors in −X, +X, −Y and +Y directions are:

two pairs of a pair of D(−1,−1) and D(0,1) as well as a pair of D(−1,1) and D(0,−1) in the −X direction, two pairs of a pair of D(1,1) and D(0,−1) as well as a pair of D(1,−1) and D(0,1) in the +X direction, two pairs of a pair of D(−1,−1) and D(1,0) as well as a pair of D(1,−1) and D(−1,0) in the −Y direction, and two pairs of a pair of D(1,1) and D(−1,0) as well as a pair of D(−1,1) and D(1,0) in the +Y direction.

Next, the correction vector of the 3×3 matrix will be obtained by adding the conditions of the attentional pixel to the effective conditions of the correction vector.

Here, the vector having a size of 1 and either alone of the X component and the Y component can be defined as a unit vector (X,Y) as follows (X,Y)={(−1,0),(1,0),(0,−1),(0,1)}.

If DR$_3$(X,Y) is regarded as the correction vector which functions in the direction of the unit vector (X,Y) from D(0,0),

DR$_3$(X,Y)={D(0,0)+D(X,Y)}/D(−X,−Y)}{D(Y,X)D(X−Y, Y−X)+D(−Y,−X) D(X+Y,Y+X)}.

Here, D(0,0)+D(X,Y) is an item referring to continuous conditions of a boundary. In this item, D(0,0) is connected with the attentional pixel, and D(X,Y) is a correcting directional component in the case that the attentional pixel is blank.

The item D(−X,−Y) in the above formula is an inhibition vector having a component opposite to a vector component in the (X,Y) direction.

In the above-mentioned formula, "/" and "+" mean logical NOT and logical OR, respectively, and the operator of logical AND is omitted.

(2) Next, a second correction vector will be obtained from the 3×5 or 5×3 matrix.

The pixels for giving correction vectors in −X, +X, −Y and +Y directions are:

two pairs of a pair of D(−1,−2) and D(0,2) as well as a pair of D(−1,2) and D(0,−2) in the −X direction, two pairs of a pair of D(1,2) and D(0,−2) as well as a pair of D(1,−2) and D(0,2) in the +X direction, two pairs of a pair of D(−2,−1) and D(2,0) as well as a pair of D(2,−1) and D(−2,0) in the −Y direction, and two pairs of a pair of D(2,1) and D(−2,0) as well as a pair of D(−2,1) and D(2,0) in the +Y direction.

Next, the correction vector of the 3×5 or 5×3 matrix can be obtained by adding the conditions of the attentional pixel to the effective conditions of the correction vector.

If the correction vector is a correction vector which functions in the direction of the unit vector (X,Y) from D(0,0), the correction vector $CR_5(X,Y)$ can be represented as follows:

$CR_5(X,Y)=\{CR_3(X,Y)+C_3(X,y)+S_3(X,Y)\}/D(-X,-Y)\{D(2Y,2X)D(X-2Y,Y-2X)+D(X+2Y,Y+2X)\}$ wherein $C_3(X,Y)=D(0,0)D(Y,X)D(-Y,-X)$ and $S_3(X,Y)=D(X-Y,Y-X)D(Y,X)D(X+Y,Y+X)D(0,0)$ wherein $C_3(X,Y)$ is a central component, and $S_3(X,Y)$ is a correcting directional component.

The item of $CR_3(X,Y)$ means that the correction vector of the 3×5 and/or 5×3 matrix is effective when the correction vector of the 3×3 matrix is present.

$CR_3(X,Y)+S_3(X,Y)$ is an item referring to continuous conditions of a boundary. In this item, $CR_3(X,Y)$ is the central component, and $S_3(X,Y)$ is a correcting directional component in the case that the attentional pixel is blank.

The item D(−X,−Y) in the above formula is an inhibition vector having a component opposite to a vector component in the (X,Y) direction.

(3) Next, a third correction vector will be obtained from the 3×7 or 7×3 matrix.

The pixels for giving correction vectors in −X, +X, −Y and +Y directions are:

two pairs of a pair of D(−1,−3) and D(0,3) as well as a pair of D(−1,3) and D(0,−3) in the −X direction, two pairs of a pair of D(1,3) and D(0,−3) as well as a pair of D(1,−3) and D(0,3) in the +X direction, two pairs of a pair of D(−3,−1) and D(3,0) as well as a pair of D(3,−1) and D(−3,0) in the −Y direction, and two pairs of a pair of D(3,1) and D(−3,0) as well as a pair of D(−3,1) and D(3,0) in the +Y direction.

Next, the correction vector of the 3×7 or 7×3 matrix can be obtained by adding the conditions of the attentional pixel to the effective conditions of the correction vector. If the correction vector is a correction vector which functions in the direction of the unit vector (X,Y) from D(0,0), the correction vector $CR_7(X,Y)$ can be represented as follows:

$CR_7(X,Y)=\{CR_5(X,Y)+C_5(X,Y)+S_5(X,Y)\}/D(-X,-Y)\{D(3Y,3X)D(X-3Y,Y-3X)+D(-3Y,-3X)D(X+3Y,Y+3X)\}$ wherein $C_5(X,Y)=C_3(X,Y)D(2Y,2X)D(-2Y,-2X)$ and $S_5(X,Y)=S_3(X,Y)D(X-2Y,Y-2X)D(X+2Y,Y+2X)$ wherein $C_5(X,Y)$ is a central component, and $S_5(X,Y)$ is a correcting directional component.

The item of $CR_5(X,Y)$ means that the correction vector of the 3×7 or 7×3 matrix is effective when the correction vector of the 3×5 or 5×3 coordinate matrix is present.

$CR_5(X,Y)+S_5(X,Y)$ is an item referring to continuous conditions of a boundary. In this item, $CR_5(X,Y)$ is the central component, and $S_5(X,Y)$ is a correcting directional component in the case that the attentional pixel is blank.

The item D(−X,−Y) in the above formula is an inhibition vector having a component opposite to a vector component in the (X,Y) direction.

(4) Calculation of a correction vector which acts on the attentional dot

The correction vector CR(X,Y) of the attentional dot obtained from all of the 3×3, 3×5, 5×3, 3×7 and 7×3 matrixes can be represented as follows:

$$CR(X,Y)=K_3CR_3(X,Y)+K_5CR_5(X,Y)+K_7CR_7(X,Y) \quad (1)$$

wherein $K_3$, $K_5$ and $K_7$ are factors by which the correction vectors of the respective coordinates are multiplied.

The reason why these factors are necessary is that the influence of the correction vector on the attentional pixel is different. The influence of the correction vector on the 3×3 coordinate is largest, and thus the factors for the 3×3 coordinate, the 3×5 or 5×3 coordinate and the 3×7 or 7×3 coordinate are, for example, 4, 2 and 1, respectively.

Then, the above-mentioned formula (1) is substituted by coordinate points of, for example, (−1,0), (1,0), (0,−1) and (0,1), whereby there can be obtained the correction vectors of CR(−1,0) in the −X direction, CR(1,0) in the +X direction, CR(0,−1) in the −Y direction and CR(0,−1) in the +Y direction.

In the case that the factors of $K_3$, $K_5$ and $K_7$ are 4, 2 and 1, each of CR(−1,0), CR(1,0), CR(0,−1) and CR(0,1) is 7 at maximum, because the correction vector information of each of $CR_3(X,Y)$, $CR_5(X,Y)$ and $CR_7(X,Y)$ is 1 (an absolute value) at maximum.

(5) Selection of Correction Vector Information

Among the correction vectors in the −X, +X, −Y and +Y directions, the largest correction vector information is employed by an optional judging means, and the correction vector information is then converted into correction video data for a smoothing processing or density doubling video data for density enhancement every the corresponding attentional pixel by the undermentioned procedure.

Next, the smoothing processing by the use of the correction vector will be described.

A. Smoothing Processing

According to the calculation formula of the correction vector, at most 7 pieces of the vector information can be obtained for each of CR(−1,0), CR(1,0), CR(0,−1) and CR(0,1), when they are multified by factors of, for example, 4, 2 and 1, and in other words, 7 kinds of the correction vector information can be obtained. Furthermore, in the case that the attentional pixel is 1 (dot) or 0 (blank), the correction information is inverted when seen from the black side, and as a result, 14 kinds of the vector information can be obtained.

Correction dots for the smoothing processing can be formed as follows. For example, in the case of an LED printer and in a divide exposure system in which one pixel is divided into a plurality of subpixels in the secondary scanning direction, followed by exposure, as disclosed in U.S. Pat. No. 641 of the present applicant, the formation of the correction dots can be achieved by dividing the attentional pixel into the subpixels under control in accordance with a signal from the register selected on the basis of the correction vector information and the kind of attentional pixel, and then exposing the subpixels. Moreover, in the case of a laser printer, the formation of the correction dots can be achieved by modulating the pulse width of the video data in accordance with the register selected on the basis of the correction vector information and the kind of attentional pixel.

FIG. 2 is a fundamental constitutional view illustrating a hardware constitution for use in the laser printer regarding an embodiment of the present invention which can achieve the smoothing processing. In a printer controller 1, as already known, the video data rasterized into 300 dpi (300×300 dots per inch$^2$) on the basis of the control of CPU 11 are read out from a font RAM 12 in correspondence with image signals from a host computer 2, and they are successively written in a video memory 13. In the video memory 13, the video data corresponding to one page or one band width are developed in the form of bits, and then converted into serial data synchronized to a video clock, and the serial video data are output to a print engine driver 20. For example, the beam of a semiconductor laser 21 is scanned via a polygon mirror 22 at a pitch interval corresponding to 300 dpi under ON/OFF modulation control on the basis of the video data to form an image pattern corresponding to the video data on a photosensitive drum 23, and printing is then carried out by a suitable electrophotography.

In the present embodiment, a smoothing processing circuit 3 shown in FIG. 3 is interposed between the printer controller 1 and the print engine driver 20, and the smoothing processing can be achieved by modulating the video data.

That is, the smoothing processing circuit 3 contains a latch circuit 32 for latching 7×7 dot data in order to form 3×7 and 7×3 windows by reading/writing between the latch circuit 32 and a 7-line memory 11 comprising SRAM 31, an arithmetic circuit 33 for calculating the correction vector information of the attentional pixel on the basis of the above-mentioned calculation formula, and a conversion circuit 34 for converting, into a correction dot, the attentional pixel output from the print controller 1 in accordance with the correction vector information output from the arithmetic circuit 33. Reference numeral 35 is a register receiving section in which various conversion registers 15A–15L for converting the attentional pixel into the correction dot on the basis of the correction vector information are received.

Next, the operation of the above-mentioned circuit will be briefly described. The 7-line memory 31 is constituted of SRAM capable of accommodating the video data of seven scanning lines and one scanning lines, i.e., 8 scanning lines. The video data which are serially output from the print controller 1 in synchronization with a video clock are successively stored in a first bank 11a of the 7-line memory 11 in turn. After the video data for one scanning line are stored in the first bank 11a, the same procedure as described above is repeated to store the video data for a second scanning line in a second bank 11b and the video data for a third scanning line in a third bank 11c in turn.

When the video data for 7 lines are stored in the first to the seventh banks, the video data stored in corresponding addresses of the first to the seventh banks are read out in turn on the basis of a latch signal by the utilization of a time until the data of the address corresponding to the eighth scanning line are output from the print controller 1, and these data are successively loaded into the 7-line shift register constituting the data latch circuit 32.

As a result, in the 7-line shift register constituting the latch circuit 32, there are stored and arrange the rasterized data (7×7) of a coordinate comprising the attentional pixel, 3 lines in front of and 3 lines in the rear of the attentional pixel and 3 bits on right and left sides of the attentional pixel, while the content of the data is successively changed owing to data transfer from the 7-line memory 11, and the rasterized data in the coordinate can be utilized to carry out a vector arithmetic processing in the arithmetic circuit 33.

In the arithmetic circuit 33, as shown in FIG. 1 (B), window data of 3×7 (X,Y) and 7×3 (X,Y) are taken out from the rasterized data (7×7) of the coordinate constituting the 7-line shift register, and ±X direction vector information, ±Y direction vector information or ±45° vector information are obtained in accordance with the correction vector calculation formula mentioned in the previous paragraph (1). Next, the attentional pixel is converted into correction video data corresponding to the above-mentioned correction vector information on the basis of the obtained vector information corresponding to the attentional pixel and the kind of attentional pixel (the dot or the blank) in the undermentioned conversion circuit 34, and the video data are then output to a print engine driver 3.

In this case, the location error of the attentional pixel to be corrected is at most ½ of a distance between the attentional pixel and an adjacent dot, and therefore even if the information of the correction vector is identical, the correction information is inverted as seen from the dot side in the case that the attentional pixel is the dot or the blank (e.g., the location error of 70% of the blank is achieved by giving a dot corrected to 30%).

Therefore, for example, in the case that 7 kinds of the correction vector information are obtained from the window data of the 3×7 (X,Y) and 7×3 (X,Y), and in the case that the attentional dot is the dot or the blank, the correction information is inverted as seen from the dot side, and therefore 14 kinds of the information can be obtained.

However, as described above, even when the fine control of the 14 kinds is carried out, the constitution is only complicated in fact. Furthermore, even if the laser beam is subjected to the ON/OFF control under fine pulse control, a precise gradation cannot be obtained owing to the scatter of an output luminous intensity in the printing section.

Thus, according to the constitution of the present invention, the 14 kinds of the correction information are classified into 6 kinds, whereby the attentional pixel to be corrected is replaced with the 6 steps of the correction information.

In this case, in the present embodiment, 6 kinds of the conversion registers 15A to 15L are prepared every one of direction components in a CR(−1,0) (−X direction), CR(1,0) (+X direction) and CR(0,−1/ 0,1) (+Y directions). That is, 18 kinds of the conversion registers are prepared in all.

Incidentally, the correction dot is generally formed by modulating the pulse width of the attentional dot. However, in the case of the laser printer, the scan line of the laser beam is directed in a horizontal direction, and therefore the dot shift in horizontal ±X directions is easy, but the shift in the vertical ±Y directions is difficult. For this reason, in the embodiment of the present invention, the processing is carried out by pulse control so that the size of the dot may be changed, without changing the dot position in the vertical direction.

Figure 4A:
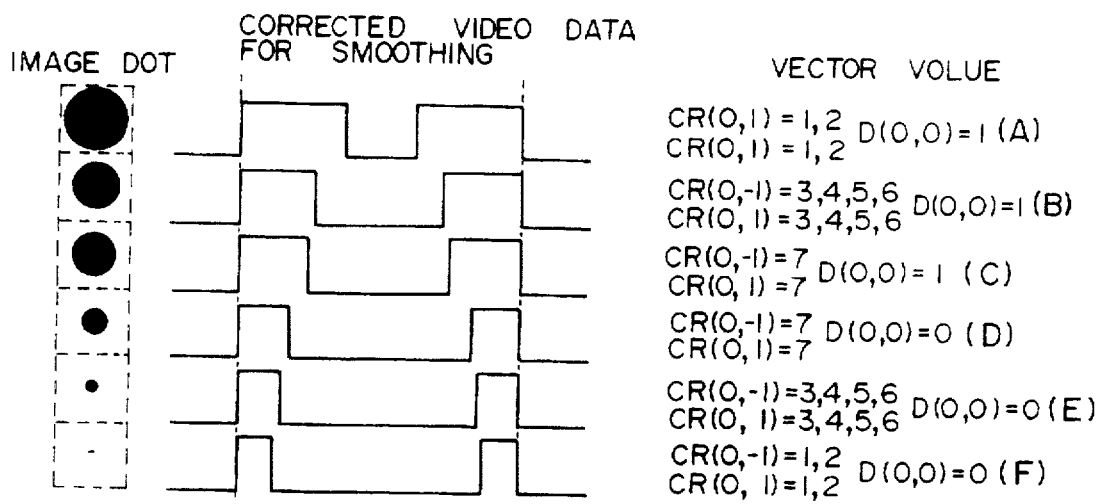
FIG. 4 are pulse waveforms illustrating kinds of image smoothing video data produced in the smoothing circuit, and (A) shows the pulse waveforms of a slanted line near to a horizontal line, and (B) and (C) show the pulse waveforms of slanted lines near to a vertical line.
Figure 4B:
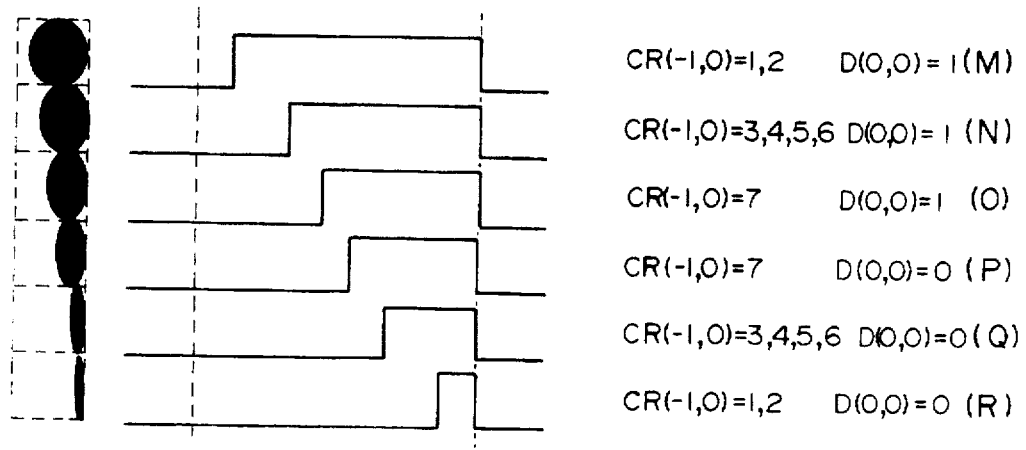
Figure 4C:
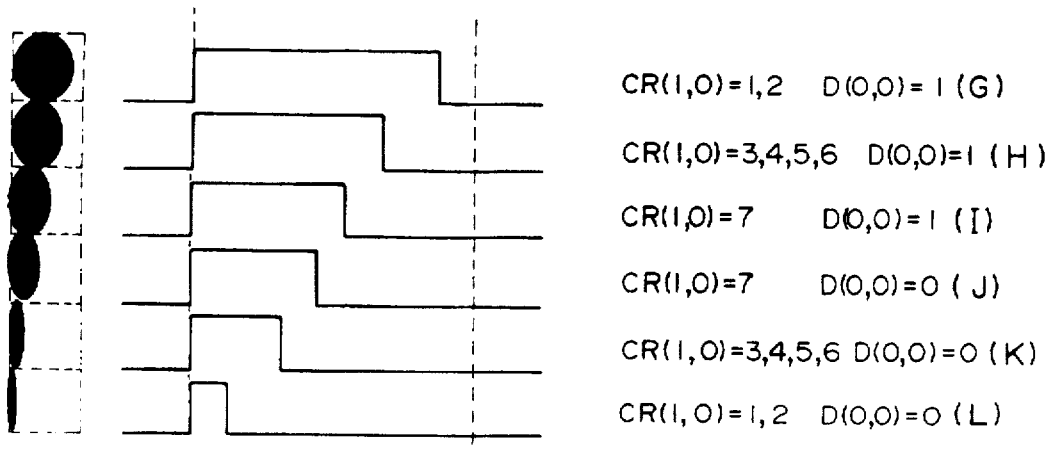

For example, as shown in FIG. 4 (I), it is first judged in the conversion circuit 34 whether a curved line (inclusive of a straight line) containing the attentional dot is a slanted line of 45° or more near to a vertical line, or a slanted line near to a horizontal line. If the curved line is near to the horizontal line, correction data selected from the undermentioned registers A to F on the basis of the attentional pixel {dot: (D(0,0=1)), blank: (D(0,0)=0)} information and the correction vector information {CR(x,y)=1–7} are parallelly written in a shift register 34a of a 16-bit memory in the conversion circuit 34. The data are serially output from the shift register 34A on the basis of a clock having a frequency 16 times as much as that of 300 dpi so as to output corrected video data to the print engine driver 3 as shown in FIG. 4, whereby the image dots (toner dots) to be formed on a photosensitive drum can be corrected. Thus, when the correction video data shown in FIG. 4 (I) are used to smooth an image pattern, a print line comprising the slanted line or the curved line near to the horizontal line as shown in FIG. 5 (A) (A) can be replaced with a print line smoothed in a secondary scanning direction as shown in FIG. 5 (A) (B).

| (Data content of conversion registers A to F) | |
|---|---|
| A: 1111111001111111 | B: 1111110000111111 |
| C: 1111110000011111 | D: 1111000000000111 |
| E: 1110000000000111 | F: 1100000000000011 |

On the other hand, in the case that the original slanted line or curved line is near to a vertical line, it is judged whether the above-mentioned vector information CR(x,y) is the vector information CR(1,0) in a positive (+X direction) or the vector information CR(−1,0) in a negative (−X direction), and correction data selected from corresponding registers of G to L and M to R on the basis of the attentional pixel {dot: (D(0,0)=1)), blank: (D(0,0)=0)} information and the correction vector information (CR(x,y)=1–7) are parallelly written in the 16-bit shift register 34a in the conversion circuit 34. The data are serially output from the shift register 34a on the basis of a clock having a frequency 16 times as much as that of 300 dpi so as to output corrected video data to the print engine driver 3 as shown in FIGS. 4 (II) and (III).

As a result, as shown in FIG. 5 (B), a print line comprising a slanted line or a curved line near to a vertical line such as (A) can be converted into a print line smoothed in a main scanning direction as shown in (B) on the side of the print engine driver 3.

| (Data content of conversion registers G to R) | |
|---|---|
| G: 1111111111111000 | H: 1111111111100000 |
| I: 1111111110000000 | J: 1111111000000000 |
| K: 1111100000000000 | L: 1110000000000000 |
| M: 0001111111111111 | N: 0000011111111111 |
| O: 0000000111111111 | P: 0000000001111111 |
| Q: 0000000000011111 | R: 0000000000000111 |

B. Density Increasing Processing

A density increase processing is also carried out on the above-mentioned vector information, and for example, in the case that an image density is doubled from 300 dpi to 600 dpi, the location error correction of the first step of ½ of a dot pitch is enough, and therefore the map information of a 3×3 coordinate is sufficient.

B1) Calculation of Correction Vector

The correction vector of the 3×3 coordinate matrix can be represented as follows.

(X,Y)={(−1,0), (1,0),(0,−1),(0,1)}

CR$_3$(X,Y)={D(0,0)+D(X,Y)}/D(−X,−Y)}{D(Y,X)D(X−Y,Y−X) +D(−Y,−X)D(X+Y,Y+X).

Figure 8:
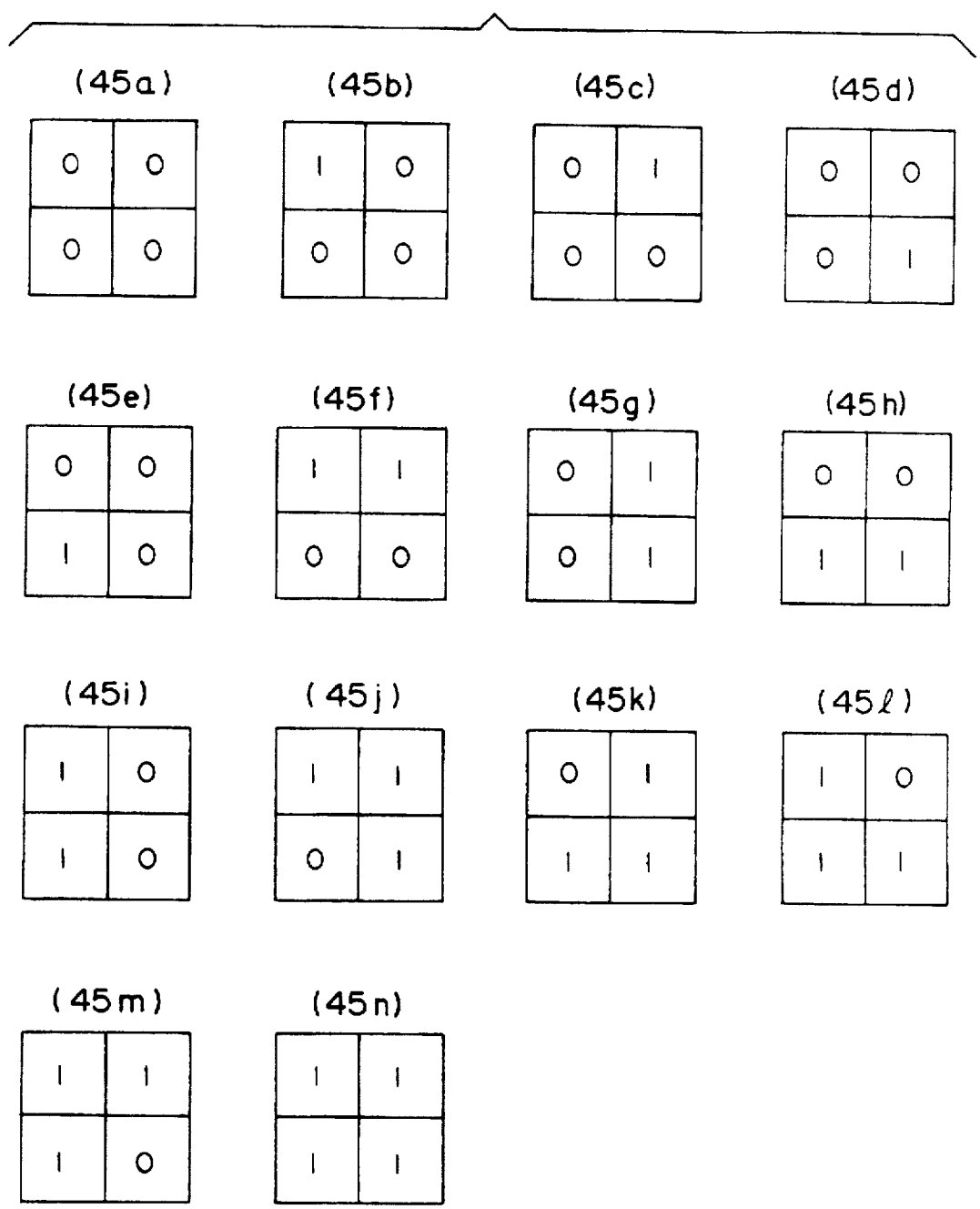
FIG. 8 shows kinds of image density increasing registers which can be used in the image density doubling circuit.

In this case, the Y component or the X component contains no location error, and therefore in the case that the image density is doubled from 300 dpi to 600 dpi, among the conversion registers shown in FIG. 8, a register 45F is selected, when CR$_3$(0,−1)=1, a register 45g is selected, when CR$_3$(1,0)=1, a register 45h is selected, when CR$_3$(0,1)=1, and a register 45i is selected, when CR$_3$(−1,0)=1.

Furthermore, Q(X,Y)=D(X,0)·D(0,Y)}·/D(−X,0)·/D(0−Y) is defined as a vector in a 45° direction which acts on D(0,0). At this time, (X≠0 and Y≠0).

The correction vector CR$_{3A}$ (X,Y) for doubling the image density is determined by the use of Q(X,Y), and CR$_{3A}$ (X,Y) can be represented as follows:

$$CR_{3A}(X,Y)=D(X,-Y)\cdot D(0,0)D(-X,Y)\text{-}/D(X,-Y)\text{-}/\ D(X,-Y)\text{-}/D(0,0)/ D(-X,Y)\}Q(X,Y) \quad (1)$$

In the above-mentioned formula, "/" and "+" mean logical NOT and logical OR, respectively, and the operator of logical AND is omitted. When subjected by the coordinate of the above-mentioned CR$_{3A}$ (X,Y)={−1,0,1}, relations between the pieces of the correction vector information of the respective directional components and the conversion registers are as follows.

A register 45b is selected, when CR$_{3A}$ (−1,−1)=−1, a register 45j is selected, when CR$_{3A}$ (−1,−1)=1, a register 45c is selected, when CR$_{3A}$ (1,1)=−1, a register 45k is selected, when CR$_{3A}$ (1,1)=1, a register 45d is selected, when CR$_{3A}$ (1,−1)=−1, a register 45l is selected, when CR$_{3A}$ (1,−1)=1, a register 45e is selected, when CR$_{3A}$ (1,1)=−1, and a register 45m is selected, when CR$_{3A}$ (1,1)=1.

Incidentally, in the present embodiment, the correction vector information is determined on the basis of the rasterized data of the 3×3 coordinate, and therefore the vector information for judging whether the attentional direction component is near to the vertical direction or the horizontal direction is not necessary. However, in the case that the precise locational correction control is carried out by the use of the rasterized data (window) of the 5×5 or more coordinate, e.g., the rasterized data of the 7×7 or more coordinate, it is first judged whether the 45° vector component of the attentional pixel is near to the vertical direction or the horizontal direction on the basis of the 3×3 coordinate. If the slanted line is near to the vertical direction, the total vector information in the ±Y axial directions is determined on the basis of the pieces of the vector information of the 3×5 and 3×7 coordinates alone. Furthermore, if the slanted line is near to the horizontal direction, the total vector information in the ±X axial directions is determined on the basis of the pieces of the vector information of the 5×3 and 7×3 coordinates alone. They are similar to the case of the above-mentioned smoothing processing.

B2) Preparation of Density Increasing Register Group 45

The density increasing register group 45 is previously prepared in accordance with resolution. However, in the case of the double conversion as described above, one pixel is enlarged twice in both of the main scanning direction and the secondary scanning direction, and therefore 2×2 conversion registers are necessary.

As shown in FIG. 8, as the conversion registers, there are prepared a conversion register 45a of a: (00,00), conversion registers 45b to 45e of 45b: (10,00), 45c: (01,00), 45d: (00,10), 45e: (00,01) in the case that the high-density pixel of "1" is rotated, conversion registers 45f to 45i of 45f: (11,00), 45g: (01,10), 45h: (00,11), 45i: (10,01) in the case that the dot pixel of "11" is rotated, conversion registers 45j to 45m of 45j: (11,10), 45k: (01,11), 45w: (10,11), 45m: (11,01) in the case that the dot pixel of "111" is rotated, and conversion registers 45a to 45n of 14 of the conversion register 15n of n: (11,11).

B3) Selection of Conversion Register

Among the correction vectors in the −X, +X, −Y and +Y directions, the largest correction vector information is employed, and density doubling registers 45a . . . are selected on the basis of the correction vector information and the attentional pixel (a dot or a blank).

Then, the one corresponding conversion register is selected from the selected conversion register group 45a–45n, and density increasing video data are formed every one scanning line on the basis of the bit data read out from the register group 45a–45n. Next, the video data are output to a print engine driver on the basis of a 2-fold video clock, whereby an image having a doubled density of 600 dpi can be formed every one scanning line. Its hardware constitution will be described in reference to FIGS. 6 and 7.

B4) Hardware Constitution

Figure 6:
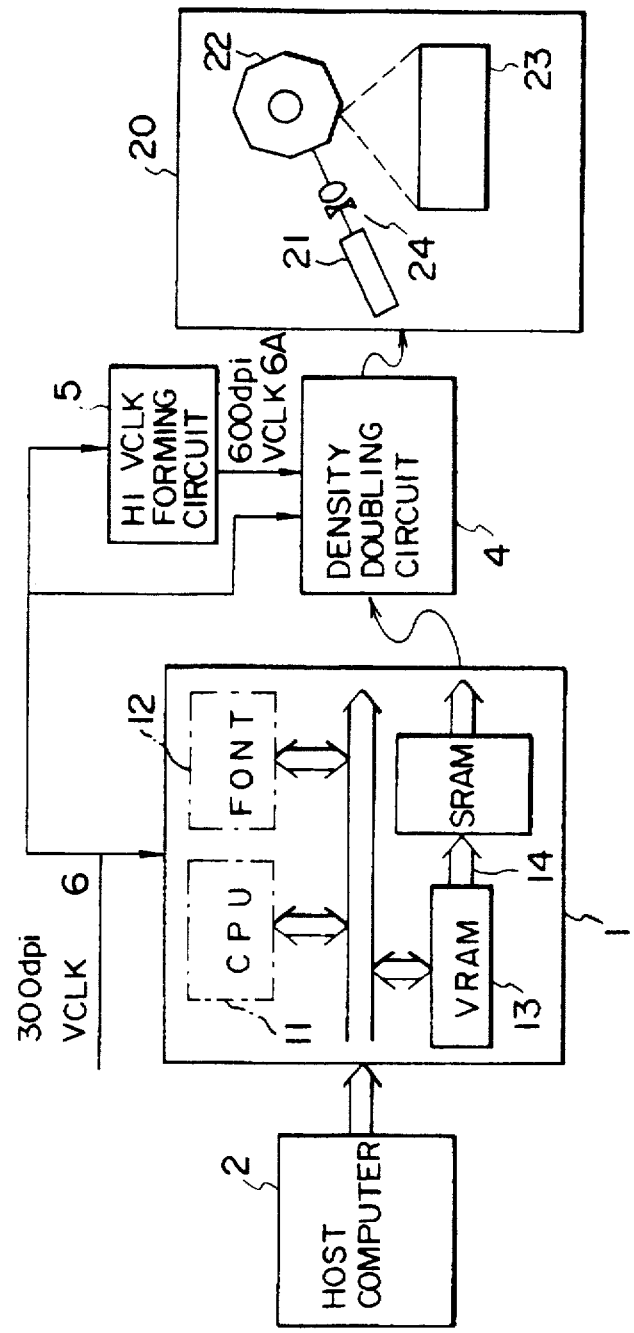
FIG. 6 is a fundamental constitutional view of a printer incorporated with an image density doubling circuit which can be used in the embodiment of the present invention.

FIG. 6 is a fundamental constitution view illustrating the hardware constitution regarding the embodiment of the present invention for doubling the image density. In a printer controller 1, as already known, the image data rasterized into 300 dpi (300×300 dots per inch$^2$) are read out from a font RAM 12 in accordance with the image signals from a host computer 2 in synchronization with a video clock, and then successively written in a video memory. In the video memory 13, the video data corresponding to one page or one band width are developed into an image, and they are then output from the video memory to a density doubling circuit every one scanning line in synchronization with a video clock on the basis of a horizontal synchronizing signal. In the density doubling circuit, the high-density video data doubled in the main scanning direction and the secondary scanning direction are output to a print engine driver 20 in accordance with a video clock having a velocity twice as much as that of a video clock producer having a 2-fold density, whereby printing of the high-density video data is carried out on the basis of the video data by photoscanning at a pitch interval corresponding to 600 dpi, while for example, laser beams are ON/OFF-controlled.

Incidentally, on the side of the print engine driver 20, the lightning time of the semiconductor laser 21 becomes ½ by the 2-fold density video clock, but the scanning width in the main scanning direction can be maintained similarly to the case of 300 dpi by doubling the rotational frequency of a polygon mirror 22. Furthermore, the density of the scanning can be doubled in the secondary direction by halving the rotational frequency of a photosensitive drum 23. As a result, a high-density image of 600 dpi can be printed. The detailed description of this constitution will be omitted because of being known.

Figure 7:
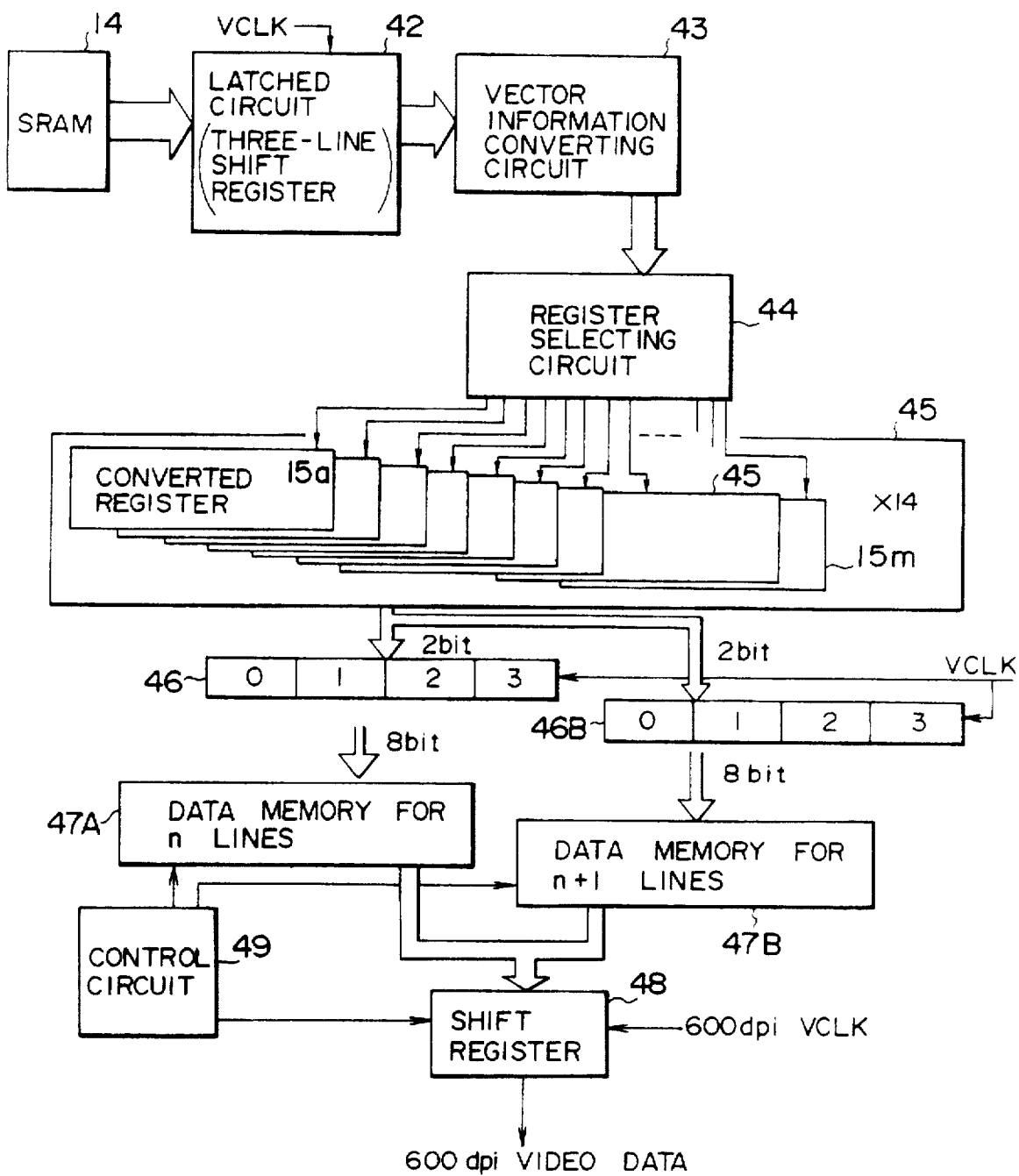
FIG. 7 is a block diagram showing the whole constitutional view of the image density doubling circuit which can be used in the present invention.

In the present embodiment, the double increase of the image density on the basis of the above-mentioned system is realized by interposing a density doubling circuit 4 shown in FIG. 7 between the printer controller 1 and the print engine driver 20.

That is, the density doubling circuit 4 is composed of a latch circuit 42 comprising a three-line shift register for latching the video data of 3 scanning lines, a vector information converting circuit 43 for calculating the above-mentioned vector information from the 3×3 video data around the attentional pixel output from the latch circuit 42, a register selecting circuit 44 for selecting one corresponding conversion register from a density doubling register group 45 in which previously prepared 2×2 data for the location error correction are stored, on the basis of the correction vector information output from the conversion circuit 43 and a kind of attentional pixel (the dot or the blank), a register storing portion 45 in which the above-mentioned 14 converted registers 15a–15m are stored, a data latch circuit 46 for n lines and a data latch circuit 46B for n+1 lines having 8-bit memory length corresponding to a bit width of the undermentioned data memories 47A, 47B, a pair of data memories 47A, 47B for storing pixel data corresponding to the n scanning lines and the n+1 scanning lines, while the 8-bit data are taken in from the above-mentioned latch circuits 46, 46B in turn, a shift register 48 which parallelly takes in the data from the data memories 47A, 47B, synchronizes the data to a high-density video clock corresponding to 600 dpi and serially outputs the density-doubled video data to the print engine driver 20, and a control circuit 49 for controlling the output of the data memories 47A, 47B and the shift register 48.

Each of the above-mentioned data memories 47A, 47B is required to have a memory region capable of writing the data of at least one scanning line.

Next, the operation of the above-mentioned circuit will be briefly described. The video data stored in a corresponding address of SRAM 14 in which the corresponding video data for 4 lines are stored are successively read out from the video memory on the basis of a latch signal which synchronizes to the video clock, and they are then successively loaded into the data latch circuit 42 comprising the three-line shift register.

As a result, in the three-line shift register constituting the latch circuit 42, there are stored three scanning lines of the attentional pixel line, one line in front of and one line in the rear of the attentional pixel by data transfer from the SRAM 14, while its content is successively renewed. Thus, the coordinate data of (3×3) around the attentional pixel can be taken out from the shift register to permit the formation of the above-mentioned correction vector information in the vector information conversion circuit 43.

In the vector information conversion circuit 43, the 3×3 (X,Y) coordinate data from the above-mentioned latch circuit 42 are taken out, and ±X direction vector information, ±Y direction vector information and if necessary, ±45° vector information are obtained on the basis of the correction vector calculation formula shown in the previous paragraph 1). Then, corresponding conversion registers 15a–15m are selected from the register storing portion in the undermentioned register conversion circuit 44 on the basis of the correction vector information corresponding to the attentional pixel from the above-mentioned information and the kind of attentional pixel (the dot or the blank).

After the conversion registers 15a–15m are selected, among the above-mentioned registers, the upper 2 bits and the lower 2 bits are parallelly loaded into the data latch circuit 46A for the n lines and the data latch circuit 46B for the n+1 lines in synchronization with the video clock of the original image, respectively.

Every time the 8-bit data are latched in the data latch circuit 46B by the repetition of the above-mentioned operation, these data are parallelly loaded into the respective data memories 47A, 47B, and the density-doubled video data corresponding to 600 dpi are stored in the data memory 47A for the n lines and the data memory 47B for the n+1 lines, respectively.

On the basis of an output control signal from the control circuit 49, the high-density video data in the data memory 47A for the n lines are parallelly loaded into the shift register 48, and the data memory for the n scanning lines are serially output from the shift register 48 to the print engine driver 20, while synchronized to the density-doubled video clock of 600 dpi. After the output, the high-density video data in the data memory 47B for the n+1 lines are parallelly loaded into the shift register 48, and the above-mentioned operation is then repeated.

While the high-density image data for the n+1 scanning lines are serially output from the shift register 48, the density of the video data for the next original scanning line is increased, and then the above-mentioned operation is repeated.

What is claimed is:

1. An image control method for use in an image output device for forming a dot matrix image based upon rasterized bit map data, the dot matrix image having a smoothness and an image density, the method comprising:

identifying an attentional pixel having a location error and an identity as at least one of a dot pixel or a blank pixel, identifying a dot distribution in a K×L coordinate around the attentional pixel, where K and L represent odd numbers, obtaining rasterized data of the K×L coordinate, converting the dot distribution around the attentional pixel into vector information on the basis of the rasterized data, correcting the location error of the attentional pixel on the basis of the vector information and the identity of the attentional pixel as at least one of a dot pixel and a blank pixel, providing a plurality of registers capable of performing at least the step of correcting the location error of the attentional pixel, selecting at least one of the plurality of registers on the basis of the vector information and the identity of the attentional pixel as at least one of a dot pixel and a blank pixel, selecting, on the basis of the correction vector information and the identity of the attentional pixel, one register from the plurality of registers in which correction data of M bits for smoothing are stored, where M represents an integer, writing correction data read out from the register in parallel in a shift register having at least an M-bit memory, and serially outputting video data for smoothing in accordance with a clock having a frequency M times greater than a video clock to a print driver, wherein the K×L coordinate defines an −X axis direction, a +X axis direction, a −Y axis direction and a +Y axis direction, and further comprising:

obtaining vector information on the basis of rasterized data of a K×L coordinate adjacent to the attentional pixel, where K≧L, and providing a register group for smoothing in which a maximum of 2K registers are provided for each axis direction.

2. The method of claim 1 wherein the step of converting the dot distribution into vector information comprises:

obtaining a first piece of vector information in the −X axis direction, the +X axis direction, the −Y axis direction and the +Y axis direction, determining which of the obtained first pieces of vector information is largest, and wherein the step of correcting the location error of the attentional pixel comprises correcting the location error of the attentional pixel on the basis of the largest of the obtained first pieces of vector information.

3. The method of claim 1 further comprising the steps of:

determining whether a vector axis direction component of the attentional pixel in a 3×3 coordinate is relatively nearer to a vertical direction or a horizontal direction, obtaining correction vector information in at least one of the −Y axis direction and the +Y axis direction when the vector axis direction component is relatively nearer to the vertical direction, obtaining correction vector information in at least one of the −X axis direction and the +X axis direction when the vector axis direction component is relatively nearer to the horizontal direction, and correcting the location error of the attentional pixel on the basis of the vector information.

4. The method of claim 1 for increasing image density, comprising:

selecting, on the basis of the correction vector information and the identity of the attentional pixel, a corresponding conversion register from a density increasing register group in which M×M bit data for location error correction are stored, wherein M represents an integer, forming high-density video data every one scanning line on the basis of bit data read out from the selected conversion register, and outputting the video data to a print engine driver in accordance with at least one of an M-fold video clock.

5. An image output device for a page printer, comprising:

means for converting into a vector a dot distribution around an attentional pixel in a K×L coordinate adjacent to the attentional pixel on the basis of rasterized data of the coordinate, where K and L represent odd numbers and K≧L, means for selecting correction vector information having a maximum location error from among pieces of vector information in a −X axis direction, a +X axis direction, a −Y axis direction and a +Y axis direction, means for selecting, on the basis of the vector information and an identity of the attentional pixel as at least one of a dot pixel and a blank pixel, a corresponding register from a plurality of registers in which at least one of correction data for smoothing an image pattern and correction data for increasing an image density are stored, means for forming video data of at least one of a smoothed image pattern and an increased image density on the basis of correction data read out from the selected register, means for selecting, on the basis of the vector information and the identity of the attentional pixel as at least one of a dot pixel and a blank pixel, a corresponding density increasing register from a plurality of density increasing registers in which M×M bit data for location error correction are stored, where M represents an integer, means for forming video data having an increased image density every one scanning line on the basis of the bit data read out from the selected density increasing register, M data memories for storing video data corresponding to n to (n+M−1) scanning lines while successively taking in M-bit data corresponding to each scanning line, where n represents an integer, a plurality of M data latch circuits located between the selected register and the data memories, the M data latch circuits having a memory length corresponding to a bit width of the data memories, whereby the M-bit data corresponding to each scanning line from the selected register is synchronized to an original video clock and latched in the respective data latch circuits every M bits, and data corresponding to the bit width are output to the data memories via each data latch circuit.

6. The device of claim 5, comprising:

means for selecting, on the basis of the vector information and the identity of the attentional pixel as at least one of a dot pixel and a blank pixel, a register from among a plurality of registers in which M-bit correction data for a smoothing process are stored, where M represents an integer, and a shift register having an M-bit memory for writing in parallel correction data read out from the register, whereby video data for a smoothing process serially output from the shift register in accordance with a clock having a frequency 16 times as much as M of a video clock can be output to a print engine driver.

* * * * *